(12) United States Patent
Dawson et al.

(10) Patent No.: US 9,104,438 B2
(45) Date of Patent: Aug. 11, 2015

(54) MAPPING COMPUTER DESKTOP OBJECTS TO CLOUD SERVICES WITHIN A CLOUD COMPUTING ENVIRONMENT

(75) Inventors: Christopher J. Dawson, Arlington, VA (US); Vincenzo V. Diluoffo, Sandy Hook, CT (US); Michael D. Kendzierski, New York, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 12/630,247

(22) Filed: Dec. 3, 2009

(65) Prior Publication Data

US 2011/0138049 A1 Jun. 9, 2011

(51) Int. Cl.
G06F 15/16 (2006.01)
G06F 9/44 (2006.01)
H04L 29/08 (2006.01)

(52) U.S. Cl.
CPC .............. *G06F 9/4443* (2013.01); *H04L 67/34* (2013.01)

(58) Field of Classification Search
CPC .......... H04L 67/34; H04L 63/10; H04L 67/10
USPC ........................................................ 709/226
See application file for complete search history.

(56) References Cited

U.S. PATENT DOCUMENTS

| | | | |
|---|---|---|---|
| 6,606,653 B1 * | 8/2003 | Ackermann et al. ........... | 709/219 |
| 7,503,009 B2 | 3/2009 | Peters | |
| 7,603,629 B1 | 10/2009 | Crosswhite et al. | |
| 8,255,873 B2 * | 8/2012 | Lazier et al. ................... | 717/124 |
| 8,555,273 B1 * | 10/2013 | Chia et al. ...................... | 717/173 |
| 2002/0140744 A1 | 10/2002 | Kanevsky et al. | |
| 2003/0004978 A1 * | 1/2003 | Greenbaum .................... | 707/202 |
| 2003/0074393 A1 * | 4/2003 | Peart .............................. | 709/203 |
| 2003/0158953 A1 * | 8/2003 | Lal ................................. | 709/230 |
| 2004/0090470 A1 | 5/2004 | Kim et al. | |
| 2006/0031529 A1 * | 2/2006 | Keith, Jr. ....................... | 709/227 |
| 2006/0107035 A1 * | 5/2006 | Tamas et al. ................... | 713/150 |
| 2007/0055754 A1 * | 3/2007 | Robbin et al. ................. | 709/223 |
| 2007/0118560 A1 * | 5/2007 | Bornhoevd et al. ......... | 707/104.1 |
| 2007/0180407 A1 * | 8/2007 | Vahtola ......................... | 715/847 |
| 2007/0198656 A1 * | 8/2007 | Mazzaferri et al. ........... | 709/218 |

(Continued)

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

(Continued)

*Primary Examiner* — Lance L Barry

(74) *Attorney, Agent, or Firm* — William E. Schiesser; Keohane & D'Alessandro PLLC; Hunter E. Webb

(57) ABSTRACT

The present invention describes an approach for general management of a client desktop with respect to accessing Cloud services. Included are means for dynamically determining, viewing, organizing, and linking desktop objects to associated server side Cloud resources and services. Specifically, the present invention provides a mechanism whereby Cloud services can be automatically represented on a plurality of client systems (for example, laptops, desktops, PDAs, etc) complete with the ability for the underlying provider of those services to be dynamically mapped based on a user's profile. The user will see standard available services regardless of the provider.

25 Claims, 7 Drawing Sheets

(56) References Cited

U.S. PATENT DOCUMENTS

| | | | |
|---|---|---|---|
| 2008/0130524 A1* | 6/2008 | Volach et al. | 370/259 |
| 2008/0263193 A1* | 10/2008 | Chalemin et al. | 709/224 |
| 2009/0049401 A1 | 2/2009 | Miller | |
| 2009/0089438 A1* | 4/2009 | Agarwal et al. | 709/228 |
| 2009/0172154 A1* | 7/2009 | Aviles Sanchez et al. | 709/224 |
| 2009/0187654 A1* | 7/2009 | Raja et al. | 709/224 |
| 2009/0228950 A1 | 9/2009 | Reed et al. | |
| 2009/0235342 A1* | 9/2009 | Manion et al. | 726/7 |
| 2009/0241031 A1 | 9/2009 | Gamaley et al. | |
| 2009/0248693 A1* | 10/2009 | Sagar et al. | 707/10 |
| 2009/0327905 A1* | 12/2009 | Mascarenhas et al. | 715/738 |
| 2010/0060791 A1* | 3/2010 | Maxson et al. | 348/563 |
| 2010/0235325 A1* | 9/2010 | Godil et al. | 707/640 |
| 2010/0242037 A1* | 9/2010 | Xie et al. | 717/178 |
| 2010/0250746 A1* | 9/2010 | Murase | 709/226 |
| 2010/0251339 A1* | 9/2010 | McAlister | 726/4 |
| 2010/0269048 A1* | 10/2010 | Pahlavan et al. | 715/740 |
| 2010/0318609 A1* | 12/2010 | Lahiri et al. | 709/205 |
| 2011/0047537 A1* | 2/2011 | Yu et al. | 717/173 |
| 2011/0087966 A1* | 4/2011 | Leviathan | 715/745 |
| 2011/0090911 A1* | 4/2011 | Hao et al. | 370/395.53 |
| 2011/0099266 A1* | 4/2011 | Calder et al. | 709/224 |
| 2011/0138049 A1* | 6/2011 | Dawson et al. | 709/226 |

OTHER PUBLICATIONS

Mell, et al., "The NIST Definition of Cloud Computing", National Institute of Standards and Technology, Information Technology Laboratory, Version 15, Oct. 7, 2009, 2 pages.

Maitland, J., "Keeping Control Isn't Easy", Chapter 4: Cloud-Based Infrastructure, SearchCloudComputing.com, 13 pages.

* cited by examiner

MAPPING COMPUTER DESKTOP OBJECTS TO CLOUD SERVICES WITHIN A CLOUD COMPUTING ENVIRONMENT

FIELD OF THE INVENTION

The present invention generally relates to client desktop management. Specifically, the present invention relates to the linking of client desktop objects with respect to Cloud services within a Cloud computing environment.

BACKGROUND OF THE INVENTION

Current desktop environments include objects that allow an end-user to select a document or service, typically by clicking on an icon or executing a command, after which the desired application is started. Cloud computing has become a popular way to offer various Information Technology (IT) concepts as services. In one implementation, a consumer or requestor can request a service they desire and transact with a Cloud provider for the needed service. However, the full accessing and leveraging of available Cloud services is not yet fully accessible from the client desktop environment.

SUMMARY OF THE INVENTION

The present invention describes an approach for general management of a client desktop with respect to accessing Cloud services. Included are means for dynamically determining, viewing, organizing, and mapping (e.g., linking) desktop objects to associated server side Cloud resources and services. Specifically, the present invention provides a mechanism whereby Cloud services can be automatically represented on a plurality of client systems (for example, laptops, desktops, PDAs, etc) complete with the ability for the underlying provider of those services to be dynamically mapped based on a user's profile. The user will see standard available services regardless of the provider. Thus, this invention provides a dynamic and end-user-controlled mechanism for searching, accessing, and locally mapping services provided within a cloud-computing environment to a client desktop.

A first aspect of the present invention provides a method for mapping computer desktop objects to Cloud resources within a Cloud computing environment, comprising: establishing a connection between a Cloud service portal and a Cloud client computer within the Cloud computing environment; selecting a Cloud service available via a first Cloud provider using the connection; and mapping the Cloud service to a desktop object on the Cloud client computer.

A second aspect of the present invention provides a system for mapping computer desktop objects to Cloud resources within a Cloud computing environment, comprising: a memory medium comprising instructions; a bus coupled to the memory medium; and a processor coupled to the bus that when executing the instructions causes the data processing system to: establish a connection between a Cloud service portal and a Cloud client computer within the Cloud computing environment; select a Cloud service available via a first Cloud provider using the connection; and map the Cloud service to a desktop object on the Cloud client computer.

A third aspect of the present invention provides a computer readable storage medium containing a program product for mapping computer desktop objects to Cloud resources within a Cloud computing environment, the computer readable storage medium comprising program code for causing a computer to: establish a connection between a Cloud service portal and a Cloud client computer within the Cloud computing environment; select a Cloud service available via a first Cloud provider using the connection; and map the Cloud service to a desktop object on the Cloud client computer.

A fourth aspect of the present invention provides a method for deploying a system for mapping computer desktop objects to Cloud resources within a Cloud computing environment, comprising: providing a computer infrastructure being operable to: establish a connection between a Cloud service portal and a Cloud client computer within the Cloud computing environment; select a Cloud service available via a first Cloud provider using the connection; and map the Cloud service to a desktop object on the Cloud client computer.

BRIEF DESCRIPTION OF THE DRAWINGS

These and other features of this invention will be more readily understood from the following detailed description of the various aspects of the invention taken in conjunction with the accompanying drawings in which.

Figure 1:
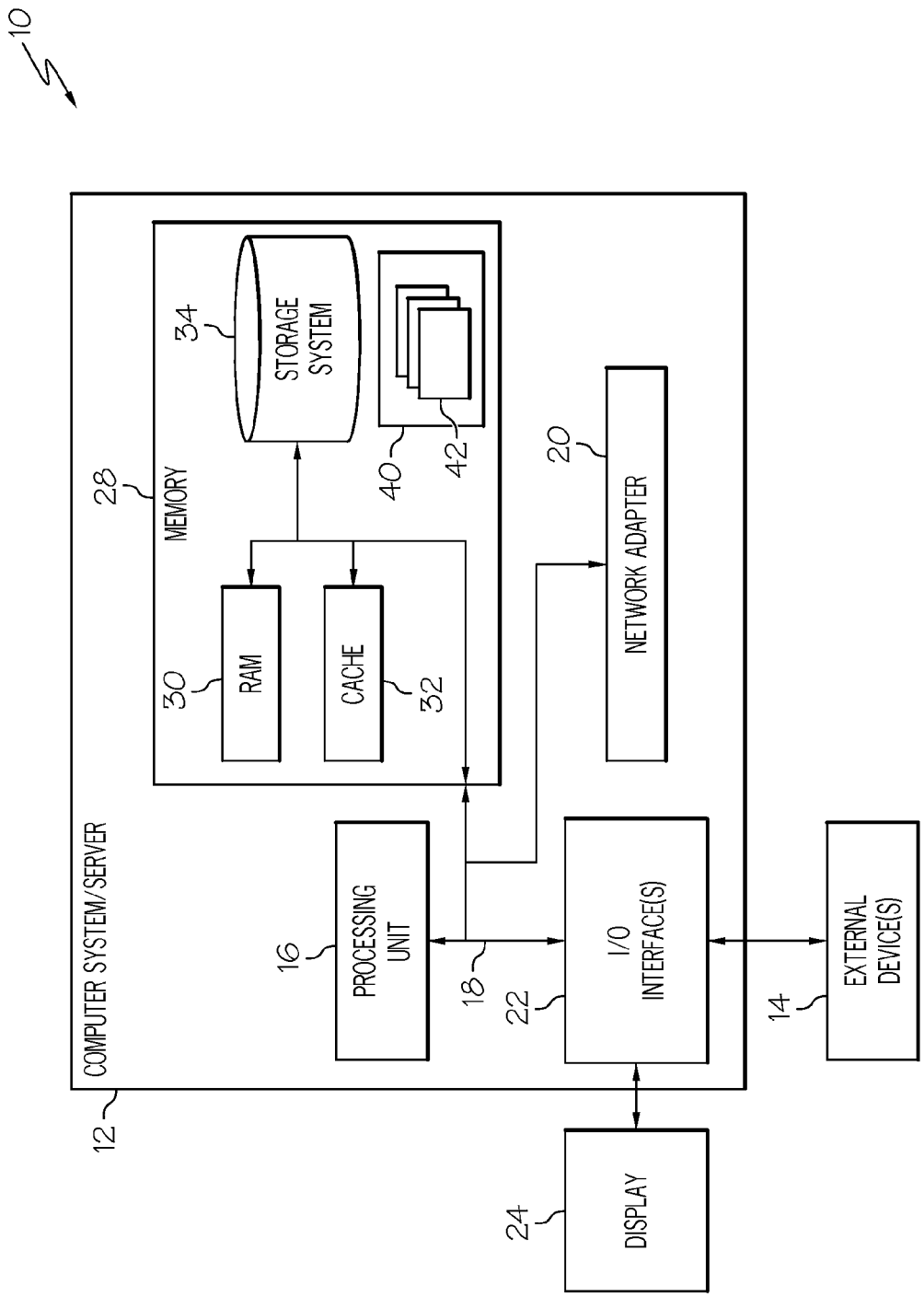
FIG. 1 shows a Cloud system node according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. Cloud Computing Definitions
II. Detailed Implementation of the Invention

I. Cloud Computing Definitions

The following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is comprised of at least five characteristics, at least three service models, and at least four deployment models.

Characteristics are as follows:

On-demand self-service: A consumer can unilaterally provision computing capabilities, such as server time and network storage, as needed automatically without requiring human interaction with each service's provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Cloud Software as a Service (SaaS): The capability provided to the consumer is to use the provider's applications running on a Cloud infrastructure. The applications are accessible from various client devices through a thin client interface such as a web browser (e.g., web-based e-mail). The consumer does not manage or control the underlying Cloud infrastructure including network, servers, operating systems, storage, or even individual application capabilities, with the possible exception of limited user-specific application configuration settings.

Cloud Platform as a Service (PaaS): The capability provided to the consumer is to deploy onto the Cloud infrastructure consumer-created or acquired applications created using programming languages and tools supported by the provider. The consumer does not manage or control the underlying Cloud infrastructure including networks, servers, operating systems, or storage, but has control over the deployed applications and possibly application hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying Cloud infrastructure but has control over operating systems, storage, deployed applications, and possibly limited control of select networking components (e.g., host firewalls).

Deployment Models are as follows:

Private cloud: The Cloud infrastructure is operated solely for an organization. It may be managed by the organization or a third party and may exist on-premises or off-premises.

Community cloud: The Cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The Cloud infrastructure is made available to the general public or a large industry group and is owned by an organization selling Cloud services.

Hybrid cloud: The Cloud infrastructure is a composition of two or more clouds (private, community, or public) that remain unique entities but are bound together by standardized or proprietary technology that enables data and application portability (e.g., Cloud bursting for load-balancing between clouds).

A Cloud computing environment is service oriented with a focus on statelessness, low coupling, modularity, and semantic interoperability.

II. Implementation of the Invention

The present invention describes an approach for general management of a client desktop with respect to accessing Cloud services. Included are means for dynamically determining, viewing, organizing, and mapping (e.g., linking) desktop objects to associated server side Cloud resources and services. Specifically, the present invention provides a mechanism whereby Cloud services can be automatically represented on a plurality of client systems (for example, laptops, desktops, PDAs, etc) complete with the ability for the underlying provider of those services to be dynamically mapped based on a user's profile. The user will see standard available services regardless of the provider. This invention thus provides a dynamic and end-user-controlled mechanism for searching, accessing, and locally mapping services provided within a Cloud computing environment to a client desktop.

A component of the present invention is the representation of available and unavailable Cloud services to a user through the use of an easy to understand graphical user interface. This invention provides a dynamic and end-user-controlled mechanism for searching, accessing, and locally mapping services provided within a Cloud computing environment to a client desktop.

Referring now to FIG. 1, a schematic of an exemplary Cloud computing node is shown. Cloud computing node 10 is only one example of a suitable Cloud computing node and is not intended to suggest any limitation as to the scope of use or functionality of the invention described herein. Regardless, Cloud computing node 10 is capable of being implemented and/or performing any of the functions set forth in section I above.

In Cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

Program/utility 40 having a set (at least one) of program modules 42 may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interface(s) 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
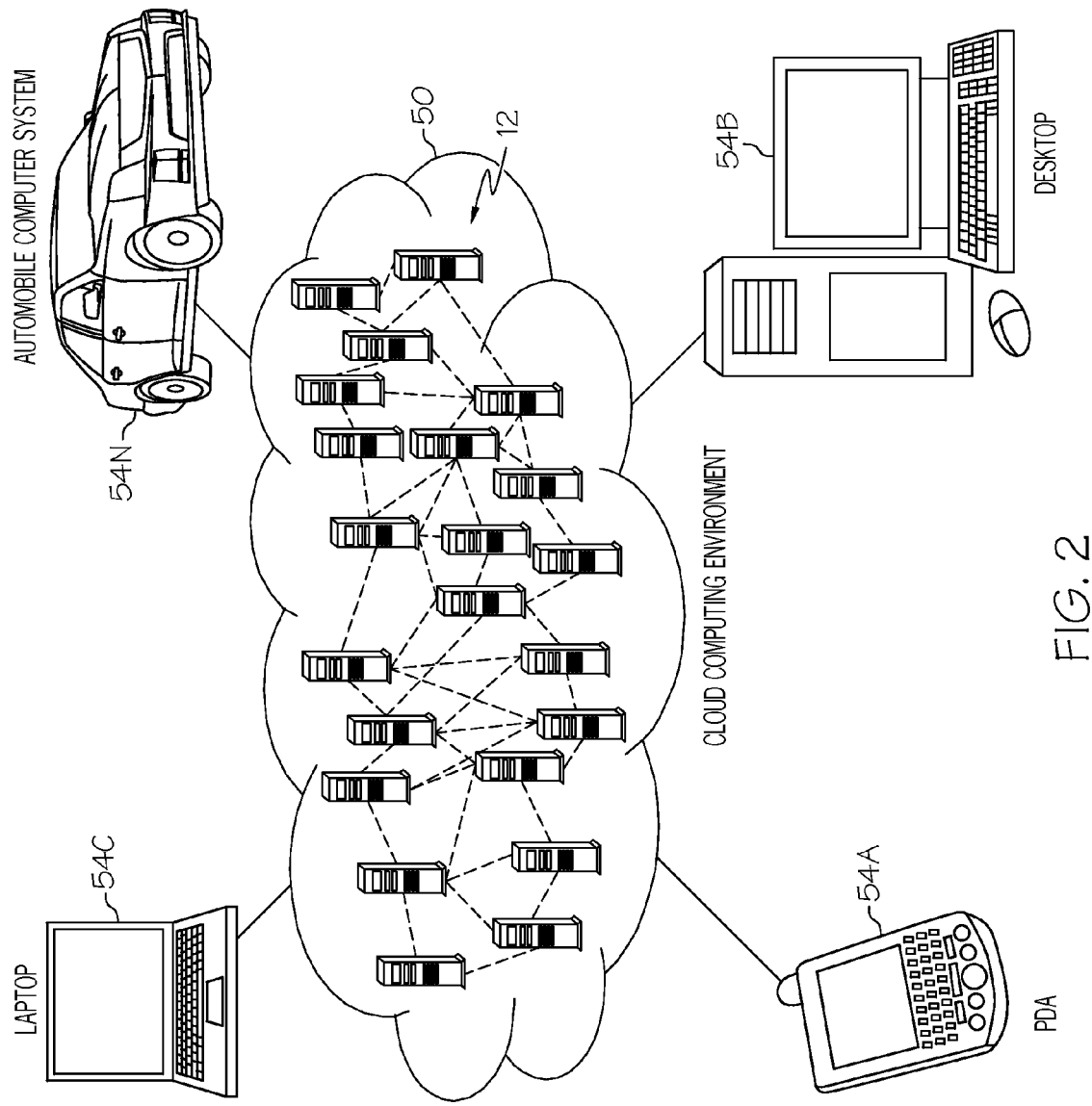
FIG. 2 shows a Cloud computing environment according to the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms and/or software to be offered as services (as described above in Section I) from Cloud computing environment 50, so as to not require each client to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
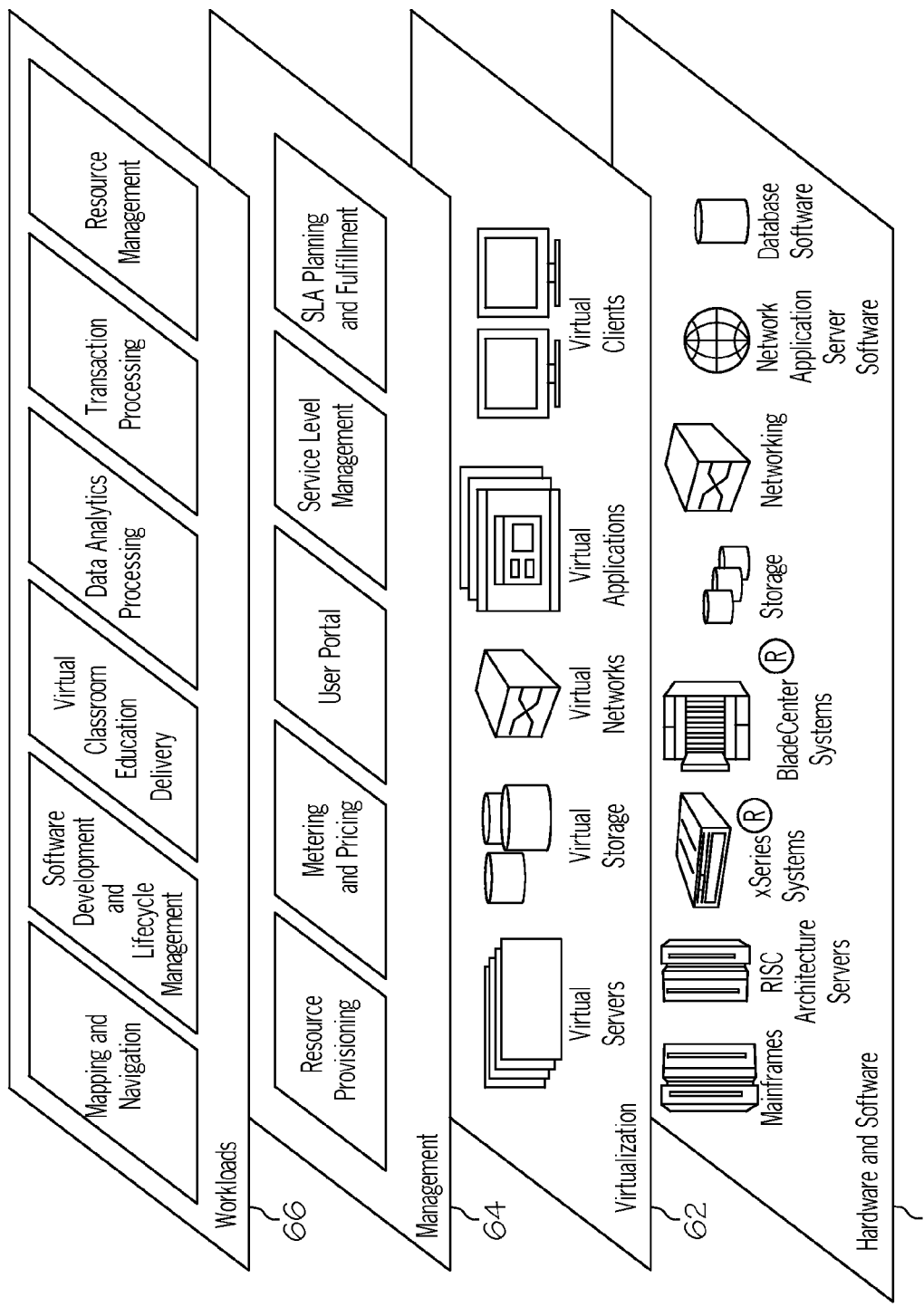
FIG. 3 shows Cloud abstraction model layers according to the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only, and the invention is not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual applications; and virtual clients.

Management layer 64 provides the exemplary functions described below. Resource provisioning provides dynamic procurement of computing resources and other resources that are utilized to perform tasks within the Cloud computing environment. Metering and pricing provide cost tracking as resources are utilized within the Cloud computing environment, and billing or invoicing for consumption of these resources. In one example, these resources may comprise application software licenses. Security provides identity verification for users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides pre-arrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing; and Cloud service mapping. As mentioned above, all of the foregoing examples described with respect to FIG. 3 are illustrative only, and the invention is not limited to these examples.

In a likely implementation, a Cloud client would connect to a Cloud service portal and would navigate available or desired services. This client interface is dynamically updated at each connection time, as some Cloud—selected Cloud services may not currently be available due to over-subscription, outage, and the like. The client would then have the option of directly mapping secondary services to the end-user desktop, after which the associated services could be accessed directly at the desktop.

Consider the example of a Cloud client utilizing a simple laptop. The user uses the laptop to write documents. Rather than pay for an expensive license for a word processing program on the laptop, the user would utilize a 'software as a service' Cloud service to provide this functionality. On the desktop, the user sees a desktop object (hereinafter "icon") called 'Document Generation'. The icon can have an appearance (e.g., color, labeling, etc.) reflective of the availability of the Cloud service. Clicking on the icon allows the user to initiate the Cloud service to start writing documents. Now imagine that the primary Cloud provider of writing documents is unavailable. Moreover, a secondary Cloud provider is automatically substituted transparently with respect to the customer. If the Cloud service is unavailable via any Cloud provider, the desktop icon may change appearance (e.g., to the color gray or transparent). Thus, under the present invention, a user can browse a set (e.g., at least one) of available Cloud services, select the service(s) he/she is interested in, and map the selected service(s) to desktop object(s).

Figure 4:
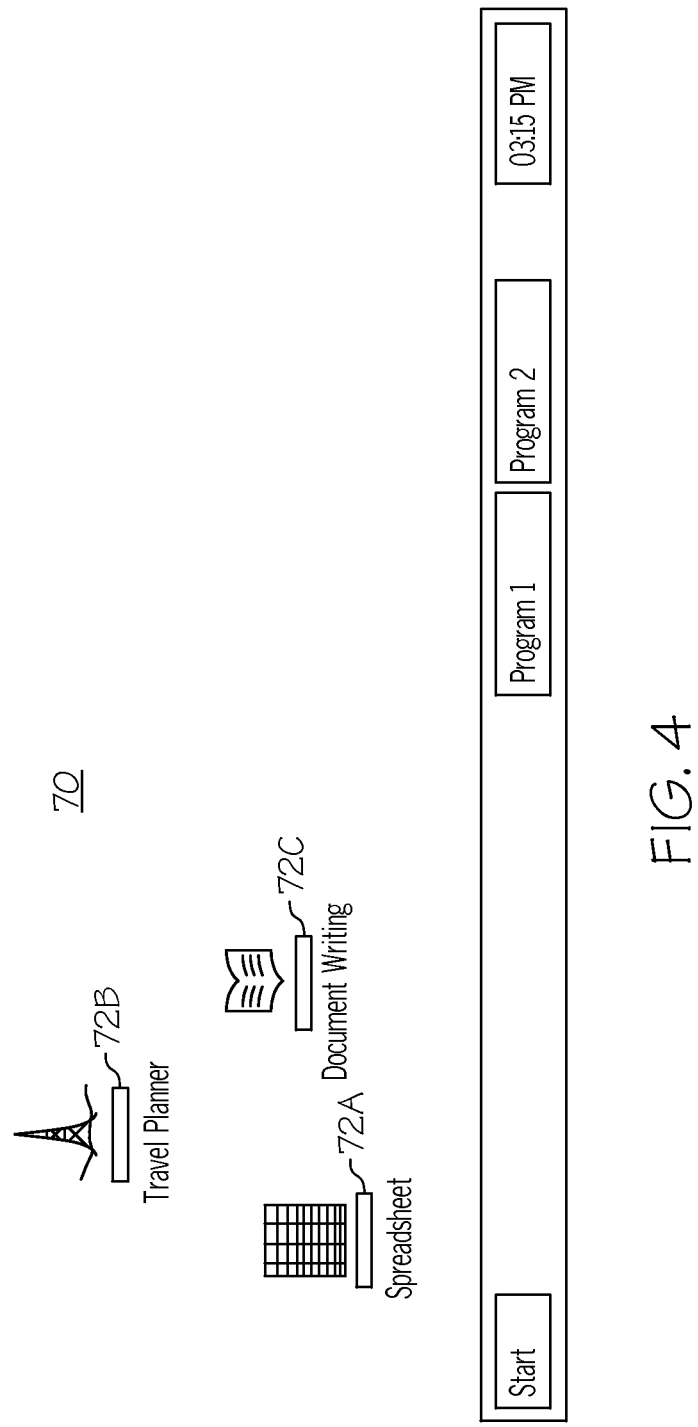
FIG. 4 shows an illustrative desktop according to the present invention.

Referring now to FIG. 4, an example of how the present invention represents Cloud services through desktop icons is shown. As depicted, desktop 70 has icons 72A-C. Further assume that Spreadsheet service 72A denoted by icon is currently unavailable, but the Travel Planner 72B and Document Writing 72C services are. In such a case, the appearances of icons 72-C can be altered to have a state reflective of the availability of the Cloud services to which they are mapped (via hyperlink).

The key is that the end-user may create a mapping from desktop icons to a variety of available Cloud services. In a preferred embodiment, the mapping function would also include any necessary client-side configuration such as updating security entries to allow service connections.

Figure 5:
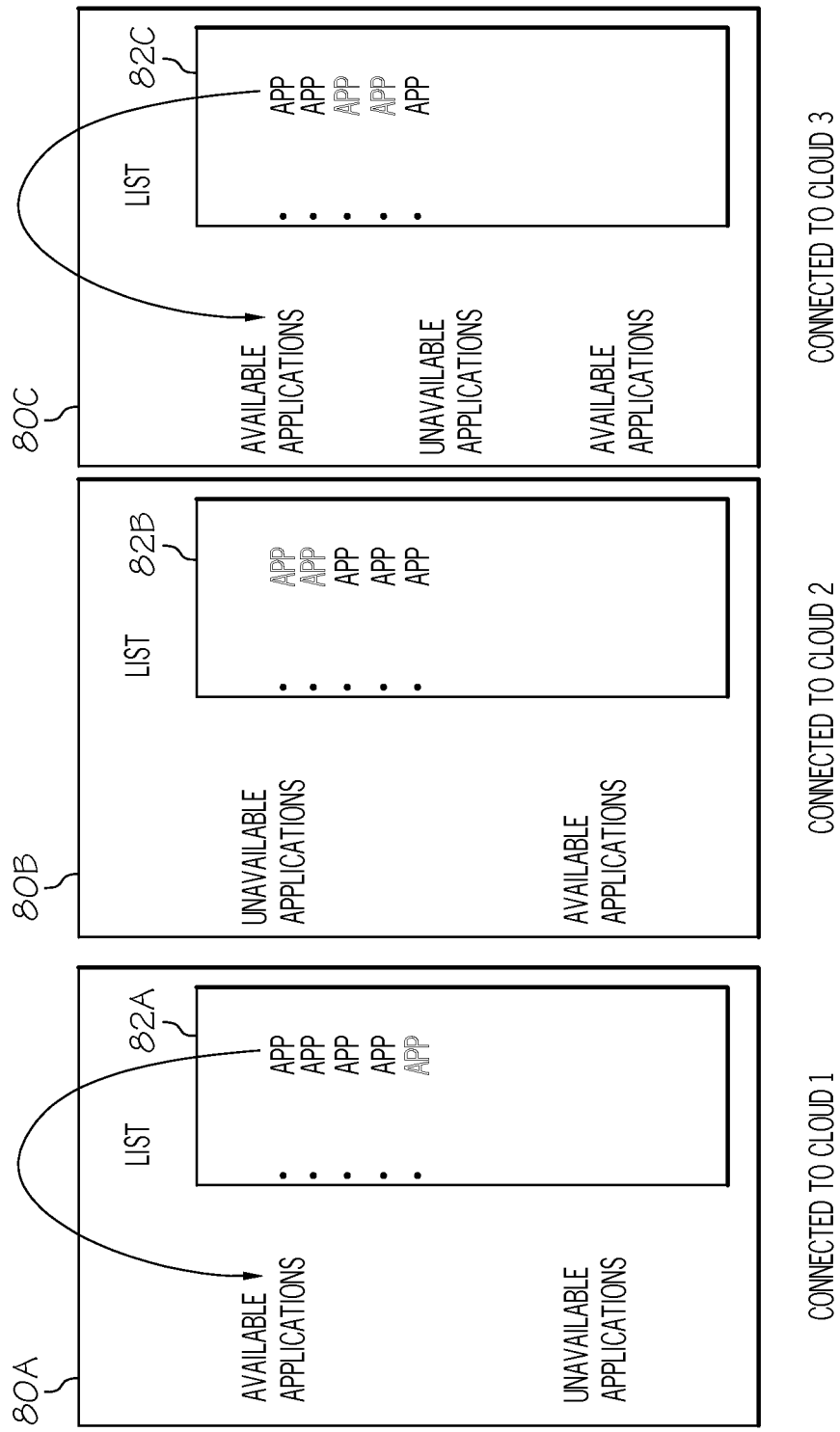
FIG. 5 shows a Cloud client connecting with a set of providers according to the present invention.

The diagram of FIG. 5 shows an example of a Cloud client connecting to three separate Cloud providers 80A-C to determine whether Cloud applications are available. Specifically, FIG. 5 depicts an example of a Cloud client displaying the lists 82A-C of potential applications that could be provided by a Cloud Provider. In each list 82A-C, there is a set of available applications denoted in black and unavailable ones denoted in gray. The grayed out applications could be caused by overbooked set of resources or the application is in a maintenance state. It should be understood that color distinction is only one possible way to depict an application being available or unavailable, and that any way of visually representing such a distinction could be implemented (e.g., striking out unavailable applications in lists 82A-C, boldfacing available applications in lists 82A-C, labeling, etc.). Regardless, in this example:

(1) The client connects to Cloud provider 82A and determines that four applications are available for use (shown in black) and one is unavailable.

(2) The client connects to Cloud provider 82b and determines that three applications are available for use and two are unavailable.

(3) The client connects to Cloud provider 82A and determines that three different applications are available and two are unavailable.

Thus, the present invention indicates both how the Cloud service applications are represented when 'available', and what happens when the service is 'unavailable'. For any unavailable Cloud services:

EITHER the Cloud client could request that a change to another Cloud provider be made to select the desired application;

OR the Cloud provider could redirect the connection to another Cloud provider that supports the desired application and is available.

By switching from one Cloud provider to another, the availability of Cloud service applications can be optimized. Consider two applications provided by Cloud provider 82A. The first is available, but the second is unavailable (grayed) out. This second application IS available in Cloud providers 82A or 82C. This may depend on if the application is already in use and the operator of computing device wants to start another application. In this case, application 1 would stay connected to Cloud provider 82A, and the second application may or may not be grayed out by searching Cloud Provider 82B or 82C in FIG. 5.

The present invention also includes a mechanism whereby a currently working application can be switched from one Cloud provider to another. This is known as a context switch. When this happens, client resources are currently running application 1, and application 2 could start the search selection. Once the switch is completed from 1 to 2 the client's resources would need to be allocated for application 2, and application 1 would be in a neutral state. The same may be true of the Cloud provider and how communications and business arrangements are constructed to support the CD's application states.

Figure 6:
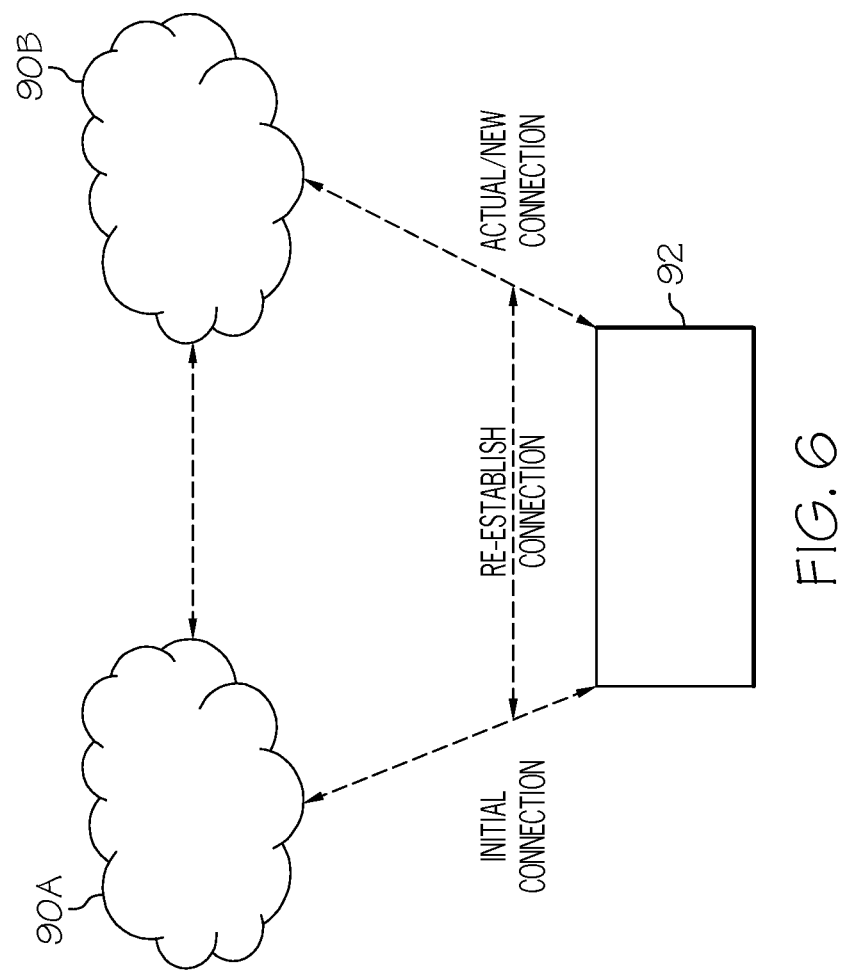
FIG. 6 shows a first Cloud provider switching to a second Cloud provider according to the present invention.

Such an example is shown in FIG. 6, which depicts how a primary Cloud provider 90A may switch service to a secondary provider 90B without knowledge from the client 92. In this example, a primary Cloud provider 90A has available capacity to provide services to the client 92. As mentioned above, a connection is established via a Cloud service portal with primary Cloud provider 90A in the Cloud computing environment. Once services are selected, they will be mapped and represented as icons on the screen in a color other than gray to show 'available'. If the primary Cloud provider 90A runs out of capacity or is otherwise not unavailable to deliver the selected/mapped services required by client 92, the Cloud makes a transfer to secondary provider 90B. Primary Cloud provider 90A and secondary provider 90B exchange user credentials, state information, data, and any other necessary information. The client 92 is updated with a new connection from a primary Cloud provider 90A to secondary provider 90B. Thus, the desktop object/icon is remapped to the Cloud service on secondary Cloud provider 90B.

The client 92 would have a daemon running that supports the connection to primary Cloud provider 90A and in this example primary Cloud provider 90A has relationships with other Cloud providers such as secondary Cloud provider 90B.

Primary Cloud provider 90A already knows its own characteristics (e.g., resource load, number of connections and what types of services are being hosted) but does not really know about secondary Cloud provider 90B except for the type of services they support. Primary Cloud provider 90A makes a decision to establish a new connect with secondary Cloud provider 90B. The daemon running on the client 92's desktop would get updated address information from primary Cloud provider 90A that a new connection to secondary Cloud provider 90B is being made. So connection information and user data is sent over to secondary Cloud provider 90B on behalf of primary Cloud provider 90A. This could also hold true if client 92 made the connection instead of Cloud providers themselves, where all the data would come from client 92.

Refresh data from both examples can be caused by query meaning a pull model or a scheduled event from the primary Cloud provider 90A (i.e., a push model). The refresh state could provide service information such as price, availability, time expiration, or resource utilization. This information will allow the user to make better decisions on how to take advantage of the offers or not. A better offer could be made by another Cloud provider such as secondary Cloud provider 90B for a specific service. The refresh feature allows information to be updated and viewed on a continuous interval verses a static environment.

Figure 7:
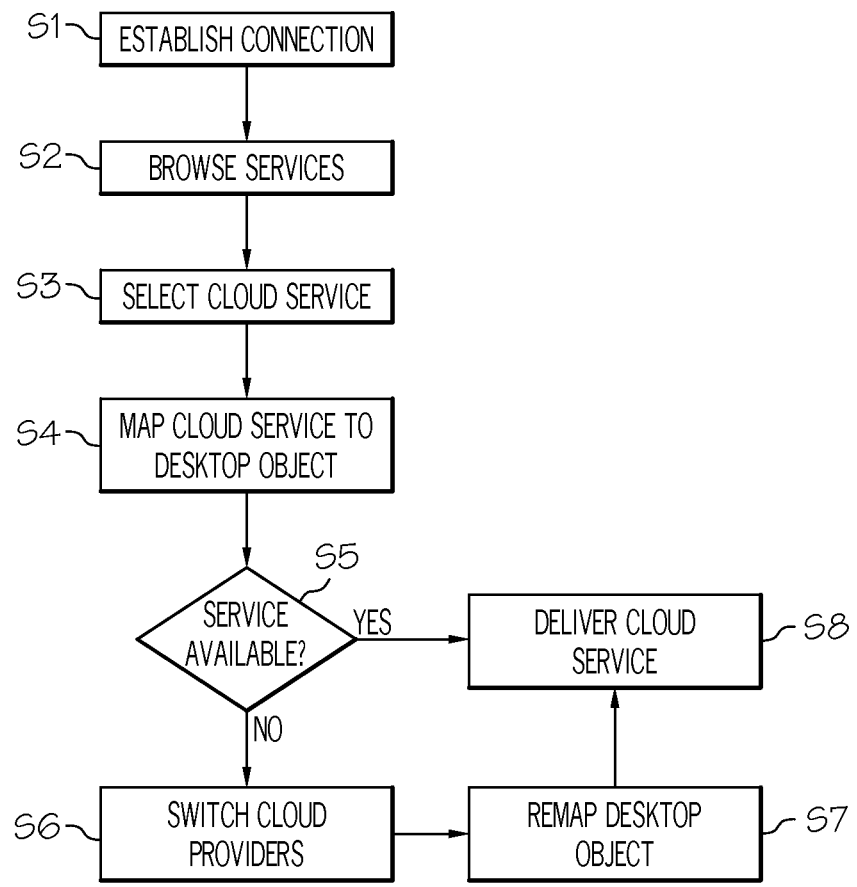
FIG. 7 shows a method flow diagram according to the present invention.

Referring now to FIG. 7, a method flow diagram according to the present invention is shown. In step S1, a connection is established between a Cloud service portal and a Cloud client computer within the Cloud computing environment. In step S2, a set of available Cloud services is browsed using the connection. In step S3, a Cloud service available via a first Cloud provider is selected using the connection. In step S4, the Cloud service is mapped to a desktop object (e.g., an icon) on the Cloud client computer. In step S5, it is determined/detected whether the Cloud service is available (via the first Cloud provider). If so, the Cloud service is delivered in step S8. If not, Cloud providers are switched in step S6, the desktop object is remapped to the Cloud service as now available via a new Cloud provider in step S7, and the Cloud service is then provided in step S8.

While shown and described herein as a Cloud service mapping solution, it is understood that the invention further provides various alternative embodiments. For example, in one embodiment, the invention provides a computer-readable/useable storage medium that includes computer program code to enable a computer infrastructure to provide Cloud service mapping functionality as discussed herein. To this extent, the computer-readable/useable storage medium includes program code that implements each of the various processes of the invention. It is understood that the terms computer-readable storage medium or computer-useable storage medium comprise one or more of any type of physical embodiment of the program code. In particular, the computer-readable/useable storage medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide Cloud service mapping. In this case, the service provider can create, maintain, support, etc., a computer infrastructure, such as computer system 12 (FIG. 1) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing Cloud service mapping functionality. In this case, a computer infrastructure, such as computer system 12 (FIG. 1), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for mapping computer desktop objects to Cloud resources within a Cloud computing environment, comprising:

establishing a connection between a Cloud service portal and a Cloud client computer within the Cloud computing environment;

selecting a Cloud service available via a first Cloud provider using the connection;
mapping the Cloud service to a desktop object on a desktop of the Cloud client computer, the mapping comprising configuring security entries on the Cloud client to allow service connections to the first Cloud provider;
switching the Cloud service from the first Cloud provider to a second Cloud provider;
remapping the desktop object on the desktop to the Cloud service as provided by a second Cloud provider, the re-mapping comprising updating the security entries on the Cloud client by replacing the security entries associated with the first Cloud provider with security entries associated with the second cloud provider to allow service connections to the second Cloud provider; and
making the Cloud service accessible from the desktop object on the desktop;
wherein a daemon on the Cloud client supports the connections to the first Cloud provider and the second Cloud provider and gets updated address information from the first Cloud provider about the second Cloud provider indicating that a new connection to the second Cloud provider is being made.

2. The method of claim 1, further comprising browsing a set of available Cloud services using the connection.

3. The method of claim 1, further comprising creating the desktop object on the Cloud client computer.

4. The method of claim 1, the desktop object being an icon.

5. The method of claim 1, the mapping comprising hyperlinking the desktop object to the Cloud service.

6. The method of claim 1, further comprising detecting when the Cloud service is unavailable via the first Cloud provider.

7. The method of claim 6, further comprising altering color of the desktop object to reflect to unavailability.

8. The method of claim 6, further comprising:
receiving a client request to switch and remap the Cloud service from the first Cloud provider to a second Cloud provider; and
wherein the switching and remapping occur in response to the client request when the Cloud service is unavailable via the first Cloud provider.

9. A system for mapping computer desktop objects to Cloud resources within a Cloud computing environment, comprising:
a memory medium comprising instructions;
a bus coupled to the memory medium; and
a processor coupled to the bus that when executing the instructions causes the system to:
establish a connection between a Cloud service portal and a Cloud client computer within the Cloud computing environment;
select a Cloud service available via a first Cloud provider using the connection;
map the Cloud service to a desktop object on a desktop of the Cloud client computer, the mapping comprising configuring security entries on the Cloud client by replacing the security entries associated with the first Cloud provider with security entries associated with the second cloud provider to allow service connections to the first Cloud provider;
switch the Cloud service from the first Cloud provider to a second Cloud provider;
remap the desktop object on the desktop to the Cloud service as provided by a second Cloud provider, the re-mapping comprising updating the security entries on the Cloud client to allow service connections to the second Cloud provider;
make the Cloud service accessible from the desktop object on the desktop; and
wherein a daemon on the Cloud client supports the connections to the first Cloud provider and the second Cloud provider and gets updated address information from the first Cloud provider about the second Cloud provider indicating that a new connection to the second Cloud provider is being made.

10. The system of claim 9, the system being further caused to browse a set of available Cloud services using the connection.

11. The system of claim 9, the system being further caused to create the desktop object on the Cloud client computer.

12. The system of claim 9, the desktop object being an icon.

13. The system of claim 9, the system being further caused to hyperlink the desktop object to the Cloud service.

14. The system of claim 9, the system being further caused to detect when the Cloud service is unavailable via the first Cloud provider.

15. The system of claim 14, the system being further caused to alter color of the desktop object to reflect to unavailability.

16. The system of claim 14, the system further being caused to:
receive a client request to switch and remap the Cloud service from the first Cloud provider to a second Cloud provider; and
wherein the switching and remapping occur in response to the client request when the Cloud service is unavailable via the first Cloud provider.

17. A non-transitory computer readable storage medium containing a program product for mapping computer desktop objects to Cloud resources within a Cloud computing environment, the non-transitory computer readable storage medium comprising program code for causing a computer to:
establish a connection between a Cloud service portal and a Cloud client computer within the Cloud computing environment;
select a Cloud service available via a first Cloud provider using the connection;
map the Cloud service to a desktop object on a desktop on the Cloud client computer, the mapping comprising configuring security entries on the Cloud client to allow service connections to the first Cloud provider;
switch the Cloud service from the first Cloud provider to a second Cloud provider;
remap the desktop object on the desktop to the Cloud service as provided by a second Cloud provider, the re-mapping comprising updating the security entries on the Cloud client by replacing the security entries associated with the first Cloud provider with security entries associated with the second cloud provider to allow service connections to the second Cloud provider;
make the Cloud service accessible from the desktop object on the desktop; and
wherein a daemon on the Cloud client supports the connections to the first Cloud provider and the second Cloud provider and gets updated address information from the first Cloud provider about the second Cloud provider indicating that a new connection to the second Cloud provider is being made.

18. The non-transitory computer storage readable medium containing the program product of claim 17, the non-transitory computer readable storage medium further comprising program code for causing the computer to browse a set of available Cloud services using the connection.

19. The non-transitory computer readable storage medium containing the program product of claim 17, the non-transitory computer readable storage medium further comprising program code for causing the computer to create the desktop object on the Cloud client computer.

20. The non-transitory computer readable storage medium containing the program product of claim 17, the desktop object being an icon.

21. The non-transitory computer readable storage medium containing the program product of claim 17, the non-transitory computer readable storage medium further comprising program code for causing the computer to hyperlink the desktop object to the Cloud service.

22. The non-transitory computer readable storage medium containing the program product of claim 17, the non-transitory computer readable storage medium further comprising program code for causing the computer to detect when the Cloud service is unavailable via the first Cloud provider.

23. The non-transitory computer storage readable medium containing the program product of claim 22, the non-transitory computer readable storage medium further comprising program code for causing the computer to alter color of the desktop object to reflect to unavailability.

24. The non-transitory computer readable storage medium containing the program product of claim 22, the non-transitory computer readable storage medium further comprising program code for causing the computer to receive a client request to switch and remap the Cloud service from the first Cloud provider to a second Cloud provider; and
    wherein the switching and remapping occur in response to the client request when the Cloud service is unavailable via the first Cloud provider.

25. A method for deploying a system for mapping computer desktop objects to Cloud resources within a Cloud computing environment, comprising:
    providing a computer infrastructure being operable to:
        establish a connection between a Cloud service portal and a Cloud client computer within the Cloud computing environment;
        select a Cloud service available via a first Cloud provider using the connection;
        map the Cloud service to a desktop object on a desktop of the Cloud client computer, the mapping comprising configuring security entries on the Cloud client to allow service connections to the first Cloud provider;
        receive a client request to switch the Cloud service from the first Cloud provider to a second Cloud provider;
        switch the Cloud service from the first Cloud provider to a second Cloud provider in response to the receiving of the client request;
        remap the desktop object on the desktop to the Cloud service as provided by a second Cloud provider, the re-mapping comprising updating the security entries on the Cloud client by replacing the security entries associated with the first Cloud provider with security entries associated with the second cloud provider to allow service connections to the second Cloud provider;
        make the Cloud service accessible from the desktop object on the desktop; and
        wherein a daemon on the Cloud client supports the connections to the first Cloud provider and the second Cloud provider and gets updated address information from the first Cloud provider about the second Cloud provider indicating that a new connection to the second Cloud provider is being made.

\* \* \* \* \*